Jan. 1, 1929.
P. MARIAGE
1,697,730
CONTROLLING DEVICE FOR POWER TRANSMISSION
FOR VEHICLES TRAVELING UPON TRACKS
Filed Dec. 30, 1926
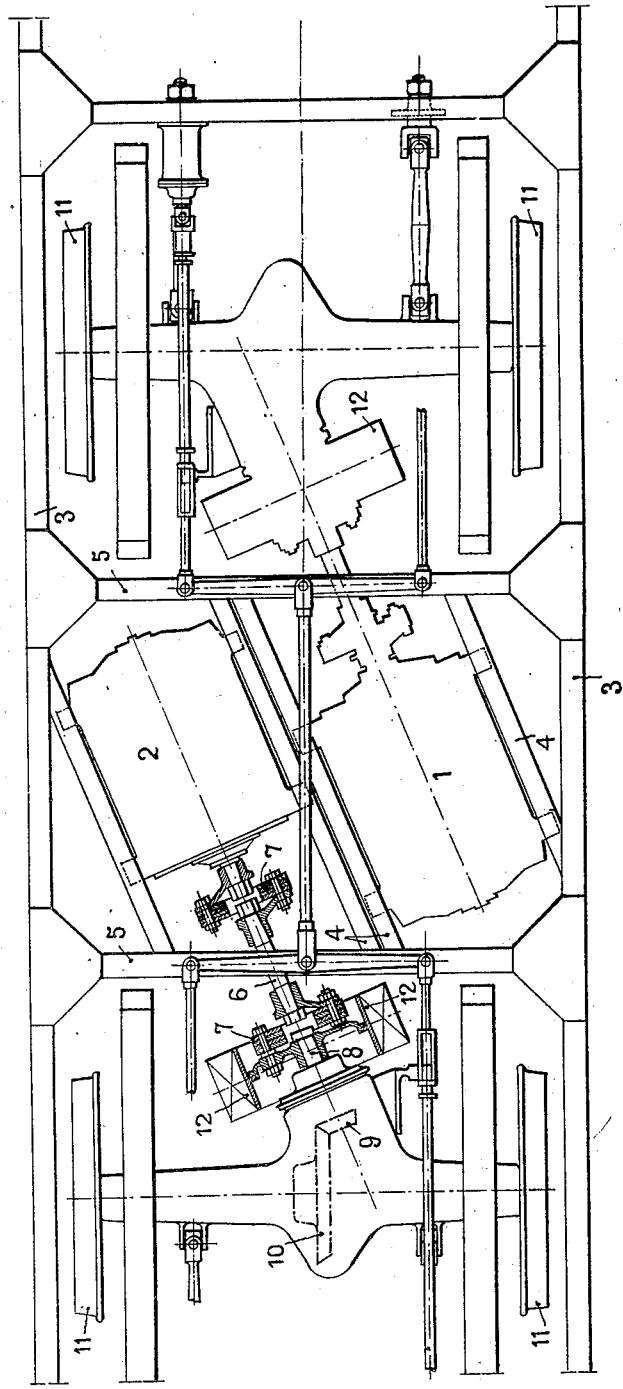
INVENTOR
PIERRE MARIAGE
BY *[signature]*
ATTORNEYS Patented Jan. 1, 1929.

1,697,730

UNITED STATES PATENT OFFICE.

PIERRE MARIAGE, OF PARIS, FRANCE, ASSIGNOR TO SOCIÉTÉ DITE: SOCIÉTÉ DE CONSTRUCTION ET D'ENTRETIEN DE MATÉRIEL INDUSTRIEL ET AGRICOLE SCEMIA, OF PARIS, FRANCE.

CONTROLLING DEVICE FOR POWER TRANSMISSION FOR VEHICLES TRAVELING UPON TRACKS.

Application filed December 30, 1926, Serial No. 157,971, and in France February 15, 1926.

The present invention relates to a controlling device for power transmission for vehicles traveling upon tracks.

Frames for electric motor vehicles are now in use in which the electric motors are placed lengthwise of the vehicle and are mounted directly upon the vehicle body, and are adapted to drive the vehicle wheels by means of a longitudinal shaft acting upon the corresponding axle by means of bevel gearing. As compared with vehicles in which the motors are mounted on the vehicle axles by means of axle bearings, the aforesaid arrangement has the advantage of reducing the dead weight per place in the vehicle, as well as the weight of the non-suspended parts.

It is further adapted for the use of brakes comprising a drum which is keyed to the shaft of the bevel pinion; since this shaft rotates at a greater speed than the vehicle axle, the braking efforts to be exercised upon the periphery of the drum will be much less than what must be applied to the wheel rims in order to obtain the same braking effect.

This disposition can however only be applied with difficulty to vehicles provided with end platforms, in which the motors are mounted between the axles; herein the motors usually have the symmetrical position about the middle plane of the vehicle, so that the wheel base must be at least double the length of the part represented by the motor, together with its driving shaft and gearing. The minimum allowable value for this wheel base will thus be considerable, so that the vehicle will be unable to travel upon short curves.

To obviate this defect, it has been proposed to mount the two motors side by side and parallel with the axis of the vehicle, but instead of acting upon each vehicle axle at a point near the middle as in the preceding case, this point is now brought adjacent one of the vehicle wheels, and this will not allow of placing upon the shaft of the bevel pinion a brake drum of sufficient size to afford the braking in the most approved conditions.

The power transmission arrangement in accordance with the present invention is characterized by the use of motors whose axes—situated in two parallel vertical planes—are inclined with reference to the longitudinal axis of the vehicle, whereby the driving may be effected by the use of motors of the usual types which act upon the vehicle axle at a point near its middle, while at the same time a suitable brake device can be mounted upon the power transmission shaft.

The appended drawings show a plan view, partly in section, of a constrctional form of the power transmission device in accordance with the inventon, which can be utilized upon tramway vehicle frames.

The motors 1 and 2, of any suitable construction, are mounted upon the tramway vehicle frame 3 by adequate means, for instance by the use of lugs or angle-pieces having any suitable disposition which are secured to the oblique cross-pieces 4 supported upon the longitudinals of the vehicle frame 3 and also upon the main cross-pieces 5.

For each of the said motors, the shaft 6 is connected, preferably through the medium of a coupling shaft 7, with the shaft 8 of a bevel pinion 9 coacting with a bevel gear wheel 10 which is keyed near the middle of the axle of the driving wheels 11. The shaft 8 of the bevel pinion 9 carries a brake drum 12 for which a sufficient place may be readily found due to the present arrangement of the several elements.

With this disposition, the vehicle axles can be driven at a point near their middle part, while utilizing motors of the current types and placing the vehicle axles sufficiently near together to allow the vehicle to travel upon curves of a small radius.

The motor shaft may be connected with the corresponding pinion actuating the vehice wheels either as shown at 7 by an elastic coupling device, or by any other suitable means, such as a universal joint shaft or the like, such means being adapted to assure the approved driving of the pinion 9 irrespectively of the movements of the motors relatively to its corresponding axle.

The said invention, which is applicable to electric motor vehicles upon tracks, and chiefly to motor vehicles for tramways, may be further applied in certain cases to traction of any suitable nature by heat engines.

What I claim is:

1. A controlling system for power transmission for vehicles upon rails, characterized by motors whose axes are situated in parallel vertical planes which are oblique with reference to the longitudinal axis of the vehicle, so as to permit the utilization, for power transmission, of motors of a current type, acting upon the axles near their middle, while permitting the disposition of brake systems upon the transmission shaft.

2. A form of construction of the power transmission device as referred to in claim 1, in which each motor, which is supported by lugs, angle-pieces or other means upon the cross-pieces which latter are mounted at suitable points on the vehicle frame, comprises a shaft which is connected by an elastic or other transmission device with the shaft of a bevel pinion in engagement with a bevel gear wheel keyed to the middle of the corresponding axle, the shaft of the pinion receiving a brake drum of any suitable disposition.

In testimony whereof I have hereunto set my hand.

PIERRE MARIAGE.